P. DEPEW & W. A. HILLIARD.
LIQUID MEASURING AND DISPENSING APPARATUS.
APPLICATION FILED MAY 9, 1912.
1,268,820.
Patented June 11, 1918.
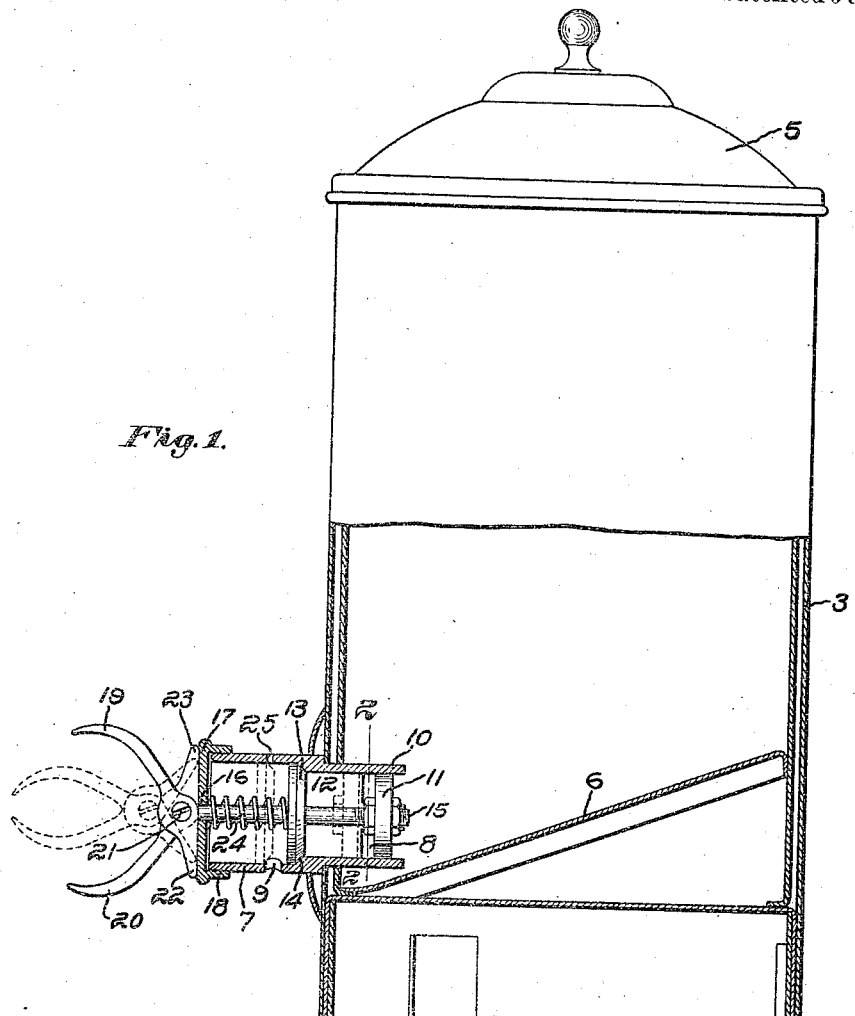
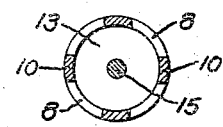

UNITED STATES PATENT OFFICE.

PAUL DEPEW, OF BOSTON, AND WALTER A. HILLIARD, OF MALDEN, MASSACHUSETTS.

LIQUID MEASURING AND DISPENSING APPARATUS.

1,268,820.  Specification of Letters Patent.  Patented June 11, 1918.

Application filed May 9, 1912. Serial No. 696,140.

*To all whom it may concern:*

Be it known that we, PAUL DEPEW and WALTER A. HILLIARD, citizens of the United States, and residents, respectively, of Boston, in the county of Suffolk, and Malden, in the county of Middlesex, and State of Massachusetts, have invented an Improvement in Liquid Measuring and Dispensing Apparatus, of which the following description, in connection with the accompanying drawings, is a specification, like characters on the drawings representing like parts.

This invention relates to improvements in liquid measuring and dispensing apparatus, and will be best understood by reference to the following specification, when taken in connection with the accompanying illustration of one specific embodiment thereof, while its scope will be more particularly pointed out in the appended claims:—

In the drawings:—

Figure 1 is a central sectional view partly in elevation of a liquid measuring and dispensing apparatus, embodying our invention, and Fig. 2 is a sectional view on line 2—2 of Fig. 1.

Referring to the drawings and to the embodiment of our invention which we have there shown for illustrative purposes, we have there shown a liquid measuring and dispensing apparatus having a suitable container 3 for the liquid, herein provided with suitable legs 4, and having a suitable cover 5. The container may, if desired, be provided with an inclined bottom 6 to facilitate the flow of liquid toward the outlet.

Leading from the interior of the container is a conduit 7, having one or more inlets 8 leading from the container, and having an exterior outlet 9. Herein the inlets 8 are formed by interrupting the circumferential wall of the conduit at a series of points, thus forming a plurality of spaced guides for a piston valve 11. This valve is normally so positioned that the liquid in the container can flow through the inlets 8 into a chamber 12 within the conduit between the valve 11 and another valve 13 normally seated against a valve seat 14 located betwen the inlets 8 and the outlet 9. The inlets 8, however, are so placed that they are closed by the valve 11 when the valve 13 opens the outlet 9, and hence only the body of liquid contained between the valves can escape through the outlet. The valves 11 and 13 may be connected to each other by suitable means for synchronously effecting the closing of the inlets 8 and opening of the outlet 9, herein a rod 15 secured in any suitable manner to said valves, and passing outwardly through an aperture 16 provided in a closure 17 for the outer end of the conduit 10. Preferably this closure is removably secured to the conduit, herein being provided with a flange 18 having screw-threaded engagement with the exterior of the conduit. This permits the valves, the valve rod, the closure 17, and all of the attached parts, to be readily removed for the purpose of cleansing and sterilizing the same, as well as the interior of the conduit and the container 3.

The valve rod 15 may be operated by a suitable means for imparting a longitudinal sliding movement to the valves, herein a pair of grasping handles 19 and 20 pivoted to each other and to the valve rod on a pivot 21 passing therethrough. These grasping handles are provided respectively with arms 22 and 23, engaging the outer face of the closure 17. By grasping the handles 19 and 20 and drawing the same together from the position shown in full lines in Fig. 1 to the position shown in dotted lines therein, the rod 15 is drawn outwardly against the tension of a suitable spring 24 interposed between the valve 13 and closure 17. When the piston valve 11 passes beyond the inlets 8, the supply of liquid to the conduit is cut off, and consequently the chamber 12 between the two valves contains a pre-determined supply of liquid which is discharged through the outlet 9 when the valve 13 passes the said outlet to the position shown in dotted lines in Fig. 1 At this time, the chamber 12 is preferably opened to the atmosphere at its upper side through a vent-hole 25, admitting atmospheric pressure to the interior of the chamber to facilitate the flow of the liquid therefrom. When the chamber 12 has been emptied, the handles 19 and 20 are then released, whereupon the valves 11 and 13 return to their normal position under the influence of the spring 24. The valves are now once more in position to admit a new supply of liquid to the chamber 12, which will be discharged in the same manner as before. As the valves return to their normal position, the air admitted by the vent 25 to the chamber 12 is released into the container 3, and stirs the cream or other liquid, thus keeping the cream in a properly stirred condition and preventing the heavier cream from rising. It will be readily understood that the device therefore forms a means for facilitating the measuring of a predetermined amount of liquid from the container, and discharging the same, and will therefore be found very useful in measuring cream for coffee, as well as for many other purposes which will readily suggest themselves.

The valves 11 and 13, the valve rod 15, the closure 17, the handles 19 and 20, the pivot 21 and the spring 24 constitute a unitary structure, which may be removed from its place by simply unscrewing the closure 17, thus permitting the withdrawal of the parts for the purpose of cleansing the same, one of the advantages being that there are no loose pieces to get lost. Another advantage is that all of the parts of the apparatus may be thoroughly cleansed and sterilized, this being a very important advantage when the apparatus is used for the measuring of cream.

While we have herein shown and described one form of our invention for illustrative purposes, and have disclosed and discussed in detail the construction and arrangement incidental to one specific embodiment thereof, it is to be understood that the invention is limited neither to the mere details or relative arrangement of parts, nor to its specific application herein shown, but that extensive deviations from the illustrated form or embodiment of the invention may be made, without departing from the principles thereof.

Having thus described one embodiment of our invention, what we claim is:—

1. A liquid measuring and dispensing apparatus having, in combination, a container for the liquid, a discharge conduit having an inlet leading from said container and having an external outlet, a normally open valve controlling said inlet, a normally closed valve controlling said outlet and separated from the first-mentioned valve by a space to receive a predetermined supply of liquid from said container, a rod connecting said valves to move the same in unison to close said inlet and open said outlet to permit the escape of the measured supply of liquid from said outlet, a spring normally holding the first-mentioned valve open and the second-mentioned valve closed, and a pair of pivotally connected grasping handles connected to said rod for imparting a longitudinal motion thereto against the tension of said spring.

2. A liquid measuring and dispensing apparatus having, in combination, a container for the liquid, the discharge conduit 10 leading from said container and having the inlet 8, the outlet 9 and the valve seat 14 between said inlet and said outlet, the valves 11 and 13, the closure 17 for said conduit provided with the aperture 16, the rod 15 connecting said valves and extending through said aperture, and the handles 19 and 20 pivoted to said rod and engaging said closure.

In testimony whereof, we have signed our names to this specification, in the presence of two subscribing witnesses.

PAUL DEPEW.
WALTER A. HILLIARD.

Witnesses:
  LOUIS A. JONES,
  CLARA L. STUART.

Copies of this patent may be obtained for five cents each, by addressing the "Commissioner of Patents, Washington, D. C."